Patented Oct. 29, 1929

1,733,440

UNITED STATES PATENT OFFICE

FRANZ OTTO ZEITSCHEL, OF HAMBURG, GERMANY

METHOD OF ISOLATING ALCOHOLS OR PHENOLS FROM MIXTURES

No Drawing. Application filed July 13, 1925, Serial No. 43,375, and in Germany August 1, 1924.

Pure alcohols or phenols can be converted into boric acid esters by allowing them to react with the mixed anhydride of boric acid and acetic acid $B(OCOCH_3)_3$. The triborates produced can then be readily obtained pure after distillation or crystallization.

It has now been found that this reaction of hydroxylated compounds of the alcohol and phenol groups, which takes place smoothly, can not only be used in connection with pure alcohols but that with the assistance of this reaction it is possible almost quantitatively to isolate alcohols of all kinds; primary, secondary, or tertiary and also phenols from mixtures containing such alcohols or phenols, either separately or in admixture, without injuring the by-products which are present. The method of operation is the same in all cases, regardless of whether the mixture contains only alcohols, only phenols, or compounds belonging to both groups. After having ascertained, as by acetylizing the quantity of alcohols present in a mixture to be examined, the calculated quantity of the double anhydride is prepared and added to the above mixture. Decomposition takes place with the development of a small amount of heat, and it is only necessary at ordinary or preferably at reduced pressure to distill off the acetic acid (or its homologues) formed, and the more readily volatile by-products from the tri-borates which are more difficult to volatilize. If the borates (or analogues) are solid they can be further purified before splitting up by recrystallization from a suitable solvent. The esters obtained are decomposed by the addition of water or aqueous alkalies and the alcoholic dissociation products are rectified or recrystallized with steam for purification.

The new method is more particularly applicable to the field of turpentine chemistry and the ether oils but it may also be used for other purposes.

In a manner very analogous to the boric acid-acetic acid-anhydride method the reaction can also be carried out with the corresponding double anhydrides of arsenic acid $As(OCOCH_3)_3$, of antimonic acid $Sb(OCOCH_3)_3$ or phosphoric acid $P(OCOCH_3)_3$. The use of anhydrides of other organic acids may afford advantages in comparison with the acetic acid anhydrides.

Examples

I. *Saponified Japanese peppermint oil.*—702 gr. with a 54.2% content of alcohols were treated with a solution of 45 gr. $B(OH)_3$ in 225 gr. acetic acid anhydride. During the vacuum distillation 353 gr. indifferent oil passed over in addition to the acetic acid, while when cooling 347 gr. solidifiable borates remained as retort residue. After neutralization 332 gr. of alcoholic constituents were obtained therefrom by steam distillation, which alcoholic distillate solidified in the cooler, and from the constants: $d_{15}: 0.903$, $\alpha_{100}: -35.60°$ was found to be almost pure menthol.

A second treatment of the indifferent oil only gave 14.3 gr. alcoholic constituents.

II. *Citronell oil Ceylon.*—380 gr. with a 57.6% content of alcohols were treated with a solution of 15 gr. $B(OH)_3$ in 75 gr. acetic acid anhydride. After vacuum distillation, 120 gr. of borate were obtained as a residue which, after neutralization, produced by steam distillation 107 gr. of alcoholic constituents 0.904–2.50°, which reacted with pulverized $CaCl_2$ and was found to be mainly geraniol.

III. *Shiu oil.*—285 gr. (with $d_{15}: 0.878$ and $\alpha_{100}: 11.00°$) of which the main portion consists of linalool, was treated with 50 gr. $B(OH)_3$ and 250 gr. acetic acid anhydride. After vaccum distillation, there remained 278 gr. borate, which were neutralized with a soda solution and distilled with steam and produced 270 gr. of almost pure linalool ($d_{15}: 0.870$, $\alpha_{100}: -15.00°$). The indifferent oil amounting to 78 gr. showed however $d_{15}: 0.960$, $\alpha_{100}: +8.50°$.

IV. For examining the accuracy of the method benzyl acetate was subjected to the reaction with 94% ester or 6% benzyl alcohol. 200 gr. of this mixture were treated with 3 gr. $B(OH)_3 + 15$ gr. acetic acid anhydride. After vacuum distillation there remained a residue of 10 gr. which was split up with a soda solution and produced 10 gr.

benzyl alcohol. The ester content of the non-reacting parts had increased to 100%. The course of the method was therefore quantitative.

It was further found that the formation of difficultly volatilizable esters can also be obtained if the boric acid or its anhydrides or its analogues (arsenic acid, antimonic acid, phosphoric acid or their anhydrides), are allowed as such to act on the mixture in the presence of heat. The reaction takes place according to the following formulæ:

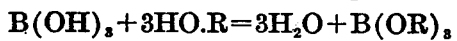

or

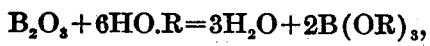

where R indicates any suitable alcohol or phenol residue, and where B can be replaced by As, Sb or P.

It is only necessary to take care that the water produced during the reaction is removed by distillation or otherwise. The quantity of the distilled water gives a direct indication as to procedure of the reaction. To the same extent that the water separation takes place the boric acid or the analogue which is used ($As_2O_3$, $Sb_2O_3$, $P_2O_3$) is gradually dissolved in the oil mixture.

The method of operation can be explained by the following examples:

V. 624 gr. of a camphor oil fraction with $d_{15}: 0.974$, $\alpha_{100}: +1.60°$ and an absolute alcohol content of 50.3%, consisting of turpentine oil and borneol, were heated with 60 gr. $B(OH)_3$ in the distillation retort to about 80 to 100° C. The water is very soon separated and is condensed in the cooler in the form of drops. When producing a slight vacuum it distils off with a small quantity of oil and can be measured in the receiver (32 gr.). After about two hours the separation of the water ceases and the boric acid has passed into solution. With a good vacuum the indifferent oil is now completely distilled off and the borates remaining as a residue are decomposed by means of a soda solution and the alcohols are driven off by steam. There are obtained:

Alcohols:

295 gr. with $d_{15}: 0.941$, $\alpha_{100}: -9.00°$

Indifferent oil:

$\frac{310 \text{ gr.}}{605 \text{ gr.}}$ with $d_{15}: 1.002$, $\alpha_{100}: +10.50°$ It was further found that when carrying out the treatment in stages according to the borate method a substantial separation of alcohols of different classes could be effected. This possibility is based upon the fact that the reaction capacity of the primary alcohols is greater and quicker than that of the secondary alcohols, that of the secondary is greater than that of the tertiary alcohols, so that by suitably controlling or measuring the addition of the boric acid or its analogues, as may be desired, it is possible to obtain from a mixture either the primary or primary and secondary, or if the primary are not present, the secondary.

VI. From a mixture of 60 gr. geraniol and 140 gr. terpineol, which at the start will not in any may react with calcium chloride, 72 gr. of alcohols are obtained by treatment with 10 gr. boric acid in the manner described, distillation of the indifferent part and decomposition of the remaining borates, which smoothly react with calcium chloride and these prove to be high percentage geraniol. In the distillate the terpineol has been correspondingly enriched.

VII. From a mixture of 60 gr. borneol and 140 gr. terpineol it is possible in quite a similar manner by means of 10 gr. boric acid to isolate about 75 gr. difficultly volatilizable borates, which become solid in the cooler upon steam distillation and are mainly found to be borneol.

VIII. From a mixture of 30 gr. geraniol, 30 gr. borneol and 140 gr. terpineol it is possible in a quite similar manner to separate by means of the borate method 120 gr. of almost pure terpineol from 70 gr. difficultly volatilizable geranyl-bornyl-borates.

It will be understood that, instead of the artificial mixtures here referred to, oils occurring in nature or technical oils can be used.

It will be understood that where in the claims I employ the term "inorganic polybasic acids of the third and fifth periodic groups" I mean to include by such term the acids of boron, phosphorus, arsenic and antimony, and their anhydrides; and where generally I employ the term "acid" or "acids" I include thereby also the anhydride or anhydrides.

Having thus described my invention what I claim as new and desire to secure by Letters Patent is:—

1. The method of isolating alcohols and phenols from mixtures containing the same, which consits in producing difficultly volatilizable boric acid esters from said alcohols and phenols by esterifying said mixture with boric acid only to the extent of forming the esters of said alcohols and phenols, distilling off the volatile admixtures, and decomposing the remaining esters by adding a solution of alkalies in water and further purifying the regenerated alcohols and phenols.

2. The method of isolating alcohols and and phenols from mixtures containing the same, which consists in producing difficultly volatilizable boric acid esters from said alcohols and phenols by esterifying said mixture with boric acid only to the extent of forming the esters of said alcohols and phenols, disstilling off the volatile admixtures, purifying the remaining esters in so far as they are solid by recrystallization, and then decomposing them by adding a solution of alkalies in water.

3. The method of isolating certain of the hydroxylated compounds of the alcohol and phenol groups from mixtures containing a plurality of such compounds, which comprises adding stoicheiometric quantities of boric acid corresponding to the molecular weight and the quantity of one or more of the most reactive of such compounds, whereby difficulty volatilizable boric acid esters of such compounds are produced, distilling off the volatile admixtures, and then hydrolyzing said esters.

4. The method as set forth in claim 3, wherein the solid esters are purified by recrystallization before hydrolysis.

5. The method as set forth in claim 3, wherein the filtrate is similarly treated with boric acid to remove the more reactive hydroxylated compounds contained therein.

6. The method of isolating certain of the hydroxylated compounds of the alcohol and phenol groups from mixtures containing a plurality of such compounds, which comprises adding stoicheiometric quantities of inorganic polybasic acids of elements of the third and fifth periodic groups corresponding to the molecular weight and the quantity of one or more of the most reactive of said hydroxylated compounds, whereby difficulty volatilizable esters of such acids are produced, distilling off the volatile admixtures, and then hydrolyzing said esters.

7. The method as set forth in claim 6, wherein the solid esters are purified by recrystallization before hydrolysis.

8. The method for isolating alcohols and phenols from mixtures containing the same, which consists in treating said mixtures with quantities of borating agents corresponding to the quantities of alcohols and phenols contained in the mixtures to produce difficultly volatilizable boric acid esters from said alcohols and phenols and esterfying said mixture with said borating agents only to the extent of forming the esters of said alcohols and phenols, distilling off the volatile admixtures and decomposing the remaining esters by adding a solution of aqueous alkalies and further purifying the regenerated alcohols and phenols.

9. The method of isolating alcohols and phenols from mixtures containing the same, which consists in producing difficultly volatilizable esters of inorganic polybasic acids of elements of the third and fifth periodic groups from said alcohols and phenols by esterifying said mixtures only to the extent of forming the esters of said alcohols and phenols, distilling off the volatile admixtures, and decomposing the remaining esters by adding a solution of aqueous alkalies and further purifying the regenerated alcohols and phenols.

10. The method of isolating alcohols and phenols from mixtures containing the same, which consists in producing difficultly volatilizable esters of inorganic polybasic acids of elements of the third and fifth periodic groups from said alcohols and phenols by esterfying said mixtures only to the extent of forming the esters of said alcohols and phenols, distilling off the volatile admixtures, purifying the remaining esters in so far as they are solid by recrystallization, and then decomposing them by adding a solution of alkalies in water.

11. The method of isolating alcohols and phenols from mixtures containing the same, which comprises reacting upon said mixtures with an inorganic polybasic acid of an element of the third and fifth periodic groups only to the extent of forming the esters of said alcohols and phenols, removing the water from the reaction zone as rapidly as it is formed, distilling off the volatile constituents, hydrolyzing the residue, and separating the alcohols and phenols therefrom.

12. The method of isolating alcohols and phenols from mixtures containing the same, which comprises reacting upon said mixtures with an inorganic polybasic acid of an element of the third and fifth periodic groups and an organic acid anhydride only to the extent of forming the inorganic acid esters of said alcohols and phenols, distilling off the volatile constituents, hydrolyzing the residue, and separating the alcohols and phenols therefrom.

In testimony whereof I have affixed my signature.

Dr. Phil. FRANZ OTTO ZEITSCHEL.